United States Patent
Ju

(10) Patent No.: US 7,570,033 B1
(45) Date of Patent: Aug. 4, 2009

(54) APPARATUS AND METHOD FOR PWM BUCK-OR-BOOST CONVERTER WITH SMOOTH TRANSITION BETWEEN MODES

(75) Inventor: Shu-Ing Ju, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 416 days.

(21) Appl. No.: 11/397,589

(22) Filed: Apr. 3, 2006

(51) Int. Cl.
*G05F 1/24* (2006.01)
*G05F 1/613* (2006.01)

(52) U.S. Cl. .................. 323/259; 323/284; 323/224

(58) Field of Classification Search .......... 323/222, 323/224, 225, 259, 282, 284, 288
See application file for complete search history.

(56) References Cited

U.S. PATENT DOCUMENTS

| 6,166,527 A | 12/2000 | Dwelley et al. |
| 6,515,457 B1 | 2/2003 | Maniktala |
| 6,677,734 B2 * | 1/2004 | Rothleitner et al. ......... 323/259 |
| 7,157,888 B2 * | 1/2007 | Chen et al. ................. 323/224 |
| 7,265,524 B2 * | 9/2007 | Jordan et al. ................ 323/225 |
| 7,336,056 B1 * | 2/2008 | Dening ........................ 323/222 |
| 7,365,525 B2 * | 4/2008 | Zhou et al. .................. 323/222 |

OTHER PUBLICATIONS

LTC3440 Data Sheet, "Micropower Synchronous Buck-Boost DC/DC Converter," Linear Technology Corporation (2001).

Chen et al., "Buck-Boost PWM Converters Having Two Independently Controlled Switches," 2001 IEEEE 32nd Annual Power Electronics Specialists Conference (PESC), 2(17-21):736-741 (2001).
Cheng et al., "Chaos Study and Parameter-Space Analysis of the DC-DC Buck-Boost Converter," IEE Proc.-Electr. Power Appl., 150(2):126-136 (2003).
Feng et al., "An Adaptive Current Mode Fuzzy Logic Controller for DC-to-DC Converters," 2003 IEEE Applied Power Electronics Conference (APEC), pp. 983-989 (2003).
Gaboriault et al., "A High Efficiency, Non-Inverting, Buck-Boost DC-DC Converter," 2004 19th Annual IEEE Applied Power Electronics Conference and Exposition (APEC '04), 3:1411-1415 (2004).
Midya et al., "Tracking Power Converter for Supply Modulation of RF Power Amplifiers," 2001 IEEE 32nd Annual Power Electronics Specialists Conference (PESC), 3(17-21):1540-1545 (2001).

(Continued)

*Primary Examiner*—Jessica Han
(74) *Attorney, Agent, or Firm*—Darby & Darby P.C.; Matthew M. Gaffney

(57) ABSTRACT

A PWM buck-or-boost converter is provided. The converter includes an error amplifier, a rectifier/splitter, a first comparator, and a second comparator. The rectifier/splitter provides two signals proportional to the departure of the error voltage from a central value but increasing in value from zero. Only one of the two signals departs from zero depending on the error voltage. The first comparator compares one of the two signals to a modulating waveform (e.g. a sawtooth waveform), and the second comparator compares the other of the two signals to the modulating waveform. Only one of the two signals intersects the modulating waveform depending on the error voltage. During buck regulation, the first comparator controls the buck switches and the output of the second comparator remains high. During boost regulation, the second comparator controls the boost switches and the output of the first comparator remains high.

19 Claims, 4 Drawing Sheets

OTHER PUBLICATIONS

Midya et al., "Buck or Boost Tracking Power Converter," IEEE Power Electronics Letters, 2(4):131-134 (2004).

Nguyen et al., "A Tracking Control Method for Boost and Buck-Boost Converters Using Input Current Prediction and Load Current Feedforward," 1997 28th Annual IEEE Power Electronics Specialists Conference (PESC), 1(22-27):189-196 (1997).

Rogers, E., "Understanding Buck-Boost Power Stages in Switch Mode Power Supplies," Texas Instruments, Application Report, SLUA059A, pp. 1-32 (2002).

Sahu et al., "A High-Efficiency Linear RF Power Amplifier with a Power-Tracking Dynamically Adaptive Buck-Boost Supply," IEEE Transactions on Microwave Theory and Techniques, 52(1)(1):112-120 (2004).

Sahu et al., "A Low Voltage, Dynamic, Noninverting, Synchronous Buck-Boost Converter for Portable Applications," IEEE Transactions on Power Electronics, 19(2):443-452 (2004).

Liqing et al., "Computation of Lyapunov Exponents for a Current-Programmed Buck-Boost Converter," 2nd International Workshop on Autonomous Decentralized System, 6-7:273-276 (2002).

* cited by examiner

APPARATUS AND METHOD FOR PWM BUCK-OR-BOOST CONVERTER WITH SMOOTH TRANSITION BETWEEN MODES

FIELD OF THE INVENTION

The invention is related to converters, and in particular, to an apparatus and method for a PWM buck-or-boost DC-DC converter with a smooth transition between buck and boost modes.

BACKGROUND OF THE INVENTION

A buck regulator may be used to generate a regulated output voltage that is less than the input voltage; conversely, a boost converter may be used to generate a regulated output voltage that is greater than the input voltage. However, DC-DC converters with step up/step down characteristics need to be used when the input and output voltage ranges overlap. Several different topologies may be used, such as SEPIC, Cuk, a one-mode buck/boost regulator, a three-mode buck/boost regulator, and the like. However, these topologies are inferior to both boost and buck regulation for efficiency and other reasons. A one mode buck/boost regulator operates in buck/boost mode only. A three-mode buck/boost regulator operates in three modes. If the input voltage is significantly greater than the output voltage, the three-mode buck/boost regulator operates in buck mode. If the input voltage is significantly less than the output voltage, the three-mode buck/boost regulator operates in boost mode. If the input voltage and the output voltage are relatively close to each other, it operates in buck/boost mode. In a typical buck/boost topology, in buck/boost mode the boost switches and the buck switches are switching during the same cycle. However, buck/boost mode is inferior to buck mode or boost mode in terms of efficiency and transient response.

A buck-or-boost (BOB) regulator operates in two modes: boost mode or buck mode. Typically, in a BOB regulator, the input voltage is compared to the desired output voltage, and the circuit operates in either buck mode or boost mode depending on the result of the comparison. However, conventional BOB regulators typically have glitches or other problems that occur when changing from buck mode to boost mode or vice versa.

BRIEF DESCRIPTION OF THE DRAWINGS

Non-limiting and non-exhaustive embodiments of the present invention are described with reference to the following drawings, in which.

DETAILED DESCRIPTION

Figure 1:
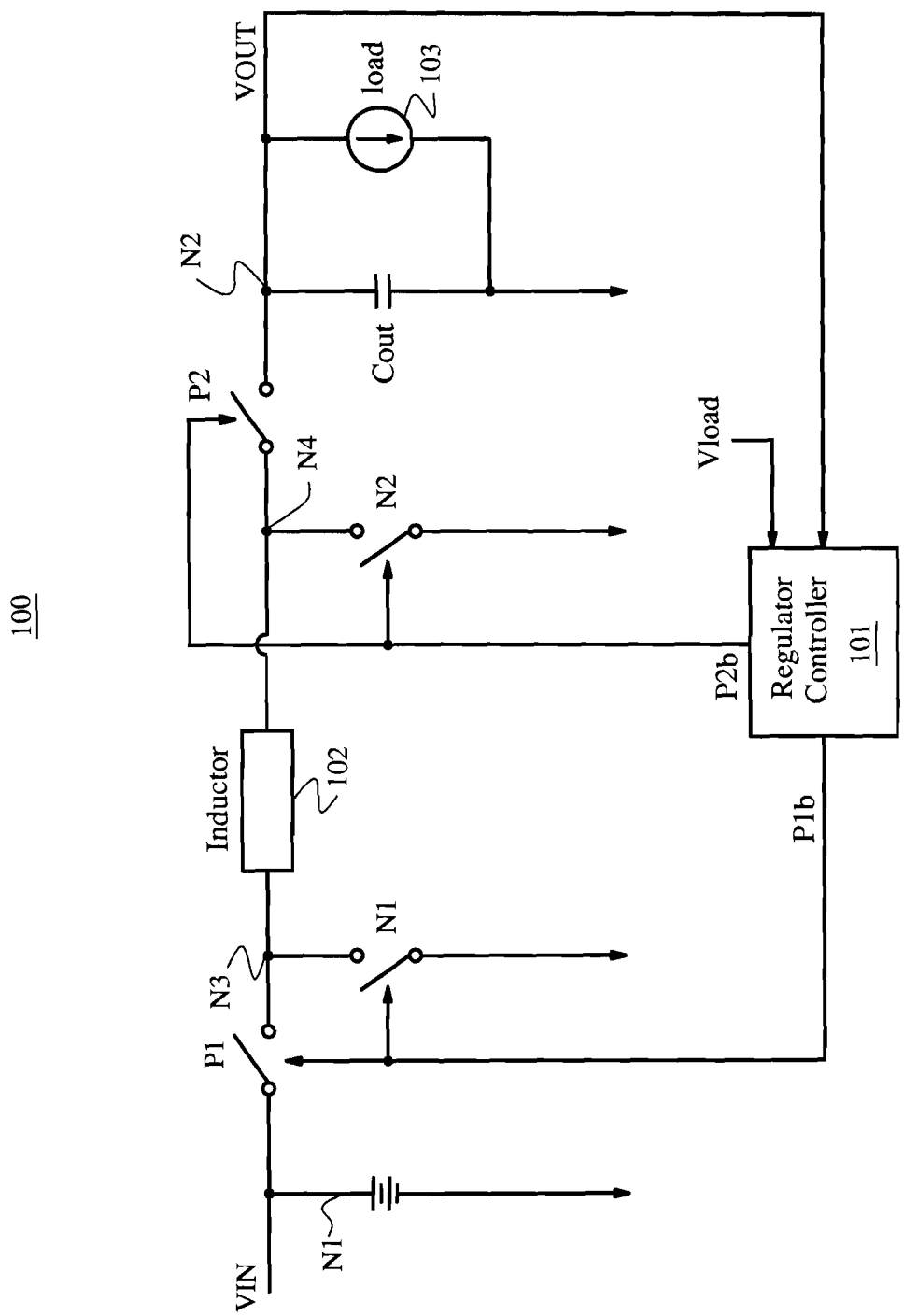
FIG. 1 illustrates a block diagram a converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a PWM buck-or-boost converter. The converter includes an error amplifier, a first comparator, a second comparator, and a rectifier/splitter. The rectifier/splitter provides two signals proportional to the departure of the error voltage from a central value but increasing in value from zero. Only one of the two signals departs from zero depending on the error voltage. The first comparator compares one of the two signals to a modulating waveform (e.g. a sawtooth waveform), and the second comparator compares the other of the two signals to the modulating waveform. Only one of the two signals intersects the modulating waveform depending on the error voltage. During buck regulation, the first comparator controls the buck switches and the output of the second comparator remains high. During boost regulation, the second comparator controls the boost switches and the output of the first comparator remains high.

FIG. 1 illustrates a block diagram converter 100. Converter 100 includes regulator controller 101. Converter 100 may further includes switches N1, N2, P1, and P2; inductor 102; output capacitor Cout; and load 103.

Converter 100 is a PWM BOB converter. At any given time during operation, converter 100 operates in either buck mode or boost mode. Further, there is a brief transition period between the two modes in which the input voltage VIN at node N1 is passed through to the output voltage node N2, so that no regulation is performed during the transition. In one embodiment, during the transition, switches P1 and P2 are closed, and switches N1 and N2 are open, so that node N1 is coupled to node N2. Inductor 102 is coupled between first inductor node N3 and second inductor node N4.

During buck mode, regulator controller 101 controls the switches so that: switch P2 is always on during buck mode, and switch N2 is always off during buck mode. Also, regulator controller 101 controls switches P1 and N1 during buck regulation according to PWM buck switching regulation to provide regulated output voltage Vout during buck mode.

During boost mode, regulator controller 101 controls the switches so that: switch P1 is always on during boost mode, and switch N1 is always off during boost mode. Also, regulator controller 101 controls switches P2 and N2 during boost regulation according to PWM boost switching regulation to provide regulated output voltage Vout during boost mode. In one embodiment, modulating signal Vmod is used for both buck regulation and boost regulation.

Although a particular embodiment of regulator 100 is illustrated in FIG. 1, many variations of the circuit shown in FIG. 1 are within the scope and spirit of the invention. For example, in other embodiments, the logic shown may be reversed or otherwise modified from the exact logic shown. For example, in the embodiment described, switch P1 is on when signal P1*b* is low, and off when switch P1 is high. However, in another embodiment, a p-type transistor in switch P1 may be replaced with an n-type transistor, or the like, so that signal P1 is provided with the reverse logic as signal P1*b*, and so that the switch P1 is on when signal P1 is high, and off when signal P1 is low. As another example, FIG. 1 illustrates an embodiment in which voltage Vin is provided by a battery. However, in other embodiments, voltage Vin may be provided from a source other than a battery. As yet another example, FIG. 1 illustrates a synchronously-rectified embodiment of circuit 100. In another embodiment, circuit 100 is an asynchronous-rectified regulator, and switches N1 and N2 are replaced with diodes. These embodiments and others are within the scope and spirit of the invention.

Figure 2:
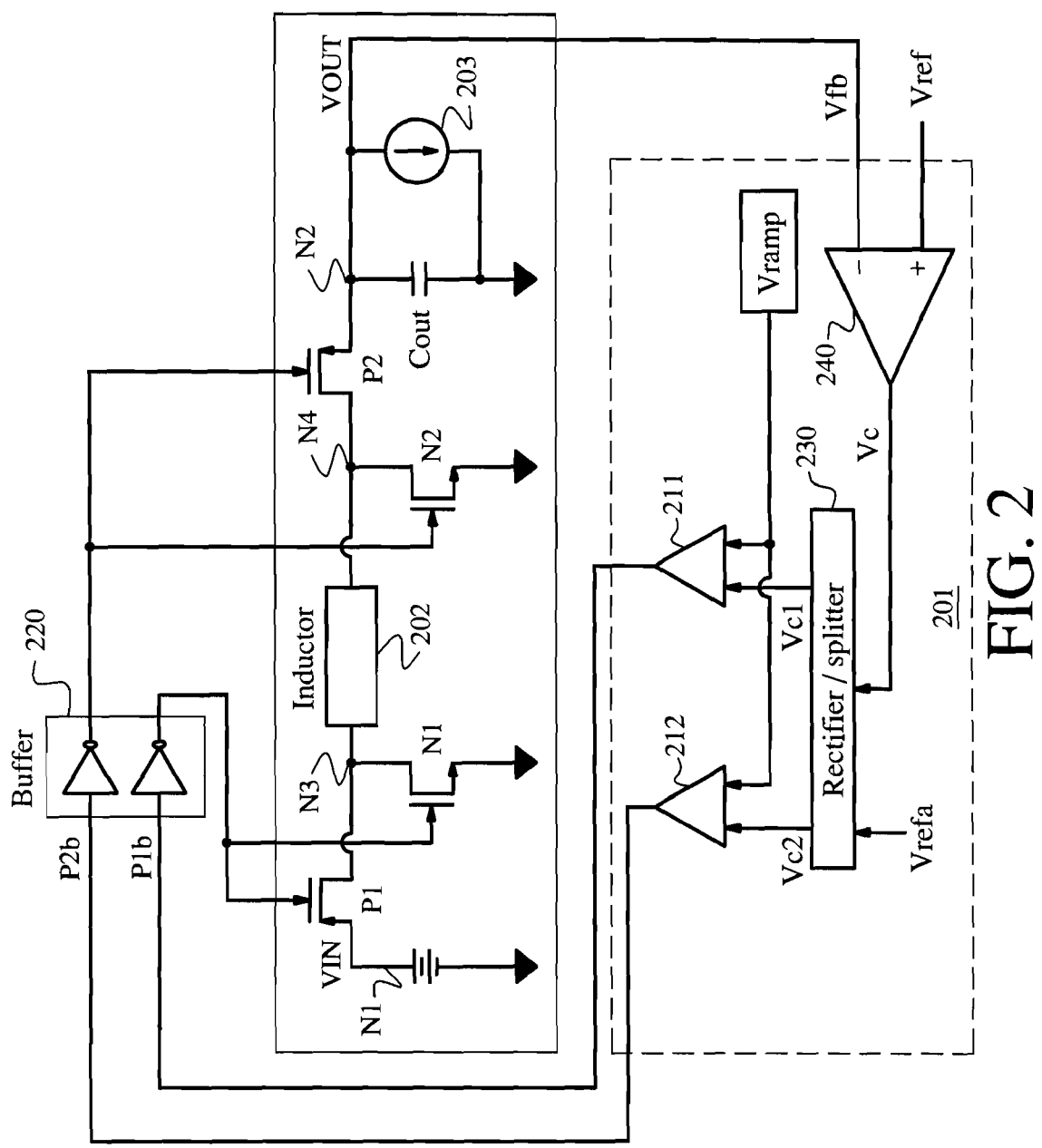
FIG. 2 shows a block diagram of an embodiment of the converter of FIG. 1.

FIG. 2 shows a block diagram of an embodiment of converter 200, which may be employed as an embodiment of converter 100 of FIG. 1. Converter 200 further includes buffer 220. Regulator controller 201 includes error amplifier 240, rectifier/splitter 230, comparator 211, and comparator 212.

Error amplifier 240 is operable to provide error signal Vc from feedback voltage Vfb and reference voltage Vref. In one embodiment, output voltage Vout is provided directly to error amplifier 240. In this embodiment, feedback voltage Vfb is output voltage Vout. In another embodiment, a voltage divider or other circuitry first provides feedback signal Vfb based on output voltage Vout. Error amplifier 240 operates as an integrator. If Vfb is greater than Vref, error voltage Vc ramps downward. Conversely, if Vfb is less than Vref, error voltage Vc ramps upwards.

Rectifier/splitter 230 is arranged to provide signals Vc1 and Vc2 based, in part, on error signal Vc and reference voltage Vrefa. Further, in one embodiment, rectifier/splitter 230 is operable to provide signals Vc1 and Vc2 such that Vc1 and Vc2 are proportional to the departure of error voltage Vc from a central value but increasing in value from zero. Only one of the two signals Vc1 and Vc2 departs from zero depending on error voltage Vc.

Additionally, comparator 211 is operable to compare signal Vc1 with ramp voltage Vramp, and to provide buck PWM signal P1*b* based on the comparison. Ramp voltage Vramp is an embodiment of modulating waveform Vmod of FIG. 1. In one embodiment, ramp voltage Vramp is a sawtooth waveform that linearly ramps from a value slightly greater than zero (e.g. 0.1 mV) to a maximum value related to the range of the control voltage and the desired minimum duty cycle. In one embodiment, regulator controller 201 includes a modulation waveform generation circuit (not shown) that generates signal Vramp.

Similarly, comparator 212 is operable to compare signal Vc2 with ramp voltage Vramp, and to provide boost PWM signal P2*b* based on the comparison. Also, buffer 220 is operable to drive switches P1, P2, N1, and N2 based on signals P2*b* and P1*b*.

Regulator controller 201 operates in two modes, buck and boost, and in one embodiment, the ripple is less than 30 mV during the mode transition.

Although a particular embodiment of regulator 200 is illustrated in FIG. 1, many variations of the circuit shown in FIG. 2 are within the scope and spirit of the invention. For example, embodiments of regulator 200 may include more or less components than illustrated in FIG. 2. For example, as previously described, although not shown in FIG. 2, regulator 200 may include a voltage divider that provides voltage Vfb from voltage Vout. Further, although not shown in FIG. 2, regulator 200 may include a compensation network coupled to the output of error amplifier 240.

Additionally, although a sawtooth waveform has been described as the modulating PWM waveform, in other embodiments, the modulating waveform may be any waveform suitable as a pulse width modulating waveform, such as a triangle wave, or the like. Further, although particular embodiments of the switches P1, N1, P2, and N2 are shown in FIG. 2, other embodiments of the switches are within the scope and spirit of the invention. For example, although field effect transistors are illustrated in FIG. 2, in other embodiments, bipolar transistors or the like may instead by used. Also, one of more of the p-type transistors may be replaced with n-type transistors, and vice versa, with a corresponding change in the logic controlling the switch. These embodiments and others are within the scope and spirit of the invention.

Figure 3:
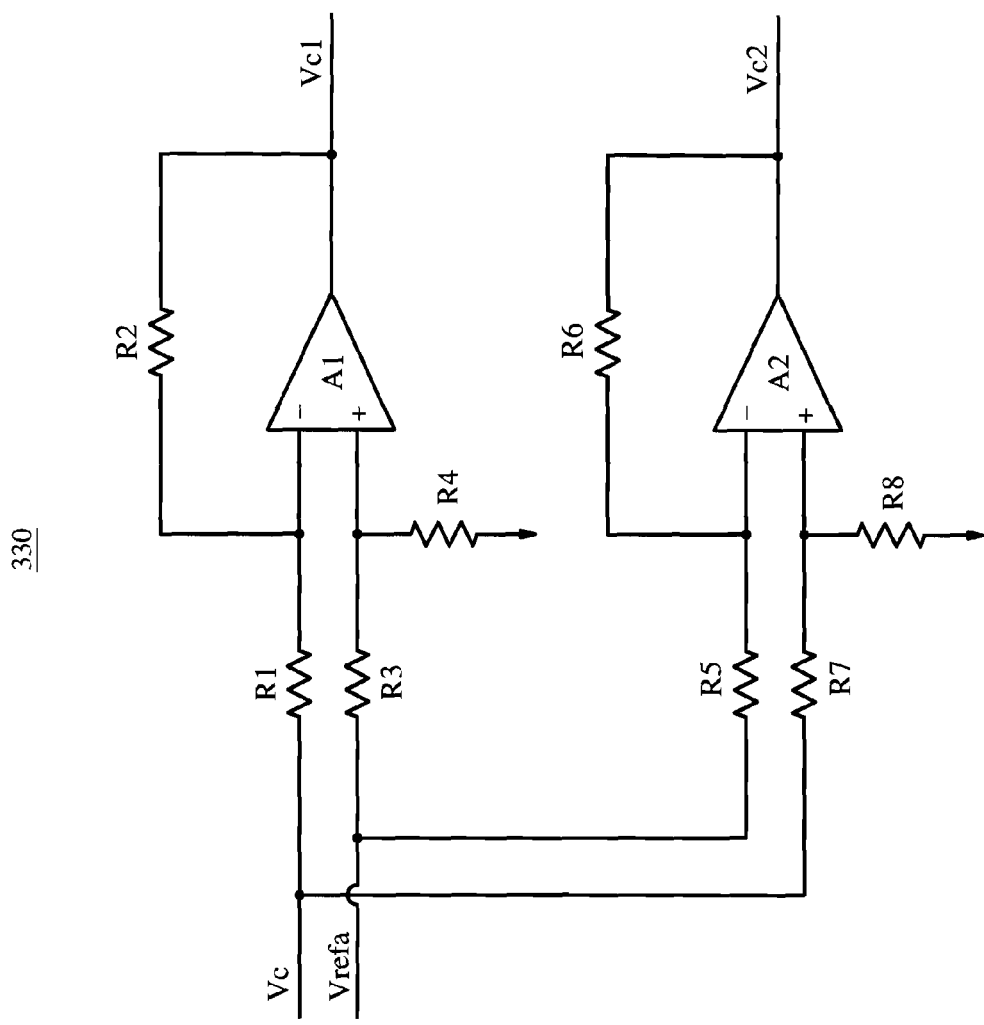
FIG. 3 illustrates a block diagram of an embodiment of the rectifier/splitter of FIG. 2.

FIG. 3 illustrates a block diagram of an embodiment of rectifier/splitter 330, which may be employed as embodiment of rectifier/splitter 230 of FIG. 2. Rectifier/splitter 330 includes resistors R1-R8, op amp A1, and op amp A2.

Op amp A1 and resistors R1-R4 are arranged to operate as a differential amplifier. Op amp A2 and resistors R5-R8 are arranged to operate as another differential amplifier. However, Vc is applied to the inverting input of the differential amplifier that includes op amp A1, so that signal Vc1 is inverted relative to error voltage Vc. Relative to voltage Vc, voltage Vc2 is level-shifted, amplified, and clamped since voltage Vc2 cannot be lower than zero volts. Relative to voltage Vc, voltage Vc1 is inverted, level-shifted, amplified, and clamped since Vc1 cannot be lower than zero volts. During buck mode, voltage Vc1 reaches zero volts when the buck regulation reaches 100% duty cycle. Conversely, during boost mode, Vc2 reaches zero volts when the boost regulation reaches 0% duty cycle. In the pass-through transition between boost and buck modes, Vc1 and Vc2 are both zero.

Reference voltage Vrefa may be provided by a reference voltage generator (not shown), or the like.

Although a particular embodiment of rectifier/splitter 330 is illustrated in FIG. 3, other embodiments of the rectifier/splitter are within the scope and spirit of the invention.

Figure 4A:
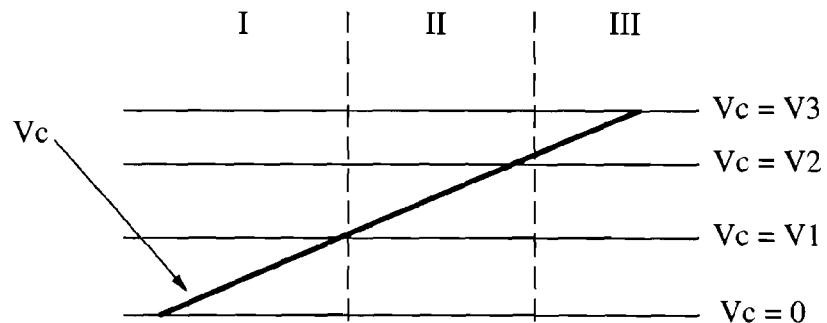
FIGS. 4A-4F show a timing diagram of waveforms of embodiments of signals for an embodiment of the regulator of FIG. 2, in accordance with aspects of the invention.
Figure 4B:
Figure 4C:
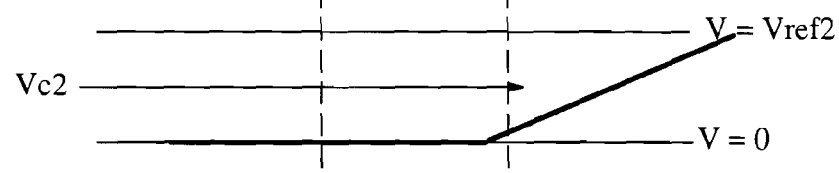
Figure 4D:
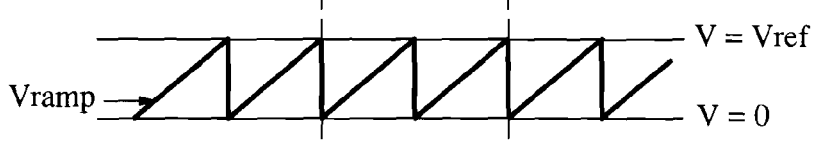
Figure 4E:
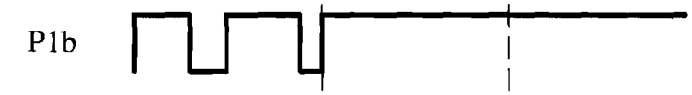
Figure 4F:

FIGS. 4A-4F show a timing diagram of waveforms of embodiments of signals for an embodiment of regulator 200 of FIG. 2. Although FIGS. 4A-4F illustrate waveforms of particular embodiments of signals for one embodiment of regulator 200 of FIG. 2, the invention is not so limited. FIGS. 4A-4F are shown by way of example and illustration only. Other embodiments of regulator 200 having waveforms different than shown in FIGS. 4A-4F may be employed within the scope and spirit of the invention. FIG. 4A illustrates a timing diagram of a waveform an embodiment of error voltage Vc. FIG. 4B shows a timing diagram of a waveform an embodiment of signal Vc1. FIG. 4C illustrates a timing diagram of a waveform an embodiment of signal Vc2. FIG. 4D shows a timing diagram of a waveform an embodiment of ramp voltage Vramp. FIG. 4E illustrates a timing diagram of a waveform an embodiment of signal P1*b*. FIG. 4F shows a timing diagram of a waveform an embodiment of signal P2*b*.

Region I represents buck mode, region III represents boost mode, and region II represents the mode transition. As shown in FIGS. 4A-4F, buck mode occurs when Vc is less than V1, boost mode occurs when Vc is greater than V2, and the mode transition occurs when Vc is greater than V1 but less than V2.

FIG. 4A shows Vc ramping upward. This may occur, for example, as a result of input voltage Vin dropping. The PWM control signal (P1b) of the input pair power switches is generated from Vc1 and Vramp. At Vc=0, regulator 200 is operating in buck mode and the duty cycle is zero. As Vc ramps upward from zero, Vc1 ramps downward from Vref1. As Vc1 ramps downward, the duty cycle of buck PWM signal P1b increases. The duty cycle of P1b is inversely proportional to Vc1. The duty cycle of signal P1b reaches 100% when Vc1 reaches 0V. If Vc continuously ramp up and reaches V1, Vc1 will clamp at 0V. Signal Vc2 clamps at 0V if Vc is lower than V2. Accordingly, signal P2b remains high throughout buck mode.

When Vc exceeds V1 (but is less than V2), Vc1 remains clamped at 0V, and Vc2 is also clamped at 0V. This is region II, the mode transition between buck and boost modes. Both P1b and P2b are high during the transition. During the mode transition, no regulation occurs, and input voltage VIN is switched to the output voltage node. Switches P1 and P2 remain closed during the mode transition. The transition prevents the condition of switching input and output power switches simultaneously. Accordingly, regulator 200 does not operate in buck/boost mode. It is desirable to not have the transition voltage range V2-V1 be too large, but to be a sufficient voltage range to ensure that, over process variation, P1b and P2b do not switch at the same time. In one embodiment, control of the transition region between modes is made relatively precise by adjusting the value of V1 and offsetting the inputs of the comparator.

In a preferred embodiment, although the invention is not so limited, the mode transition occurs when Vc1 and Vc2 are both below Vramp, as opposed to an embodiment in which the logic is reversed in such a way that the mode transition occurs when Vc1 and Vc2 are both above Vramp. In this way, V2-V1 is independent of the Vramp peak value. Normally the peak of the ramp can vary considerably over the variation of supply voltage and ambient temperature. In an alternative embodiment in which the transition region occurs when Vc1 and Vc2 reach above the peak of Vramp, then V2-V1 depends on the peak value of Vramp and has larger variation.

Although the pass-through condition (region II), is described as a mode transition, it is not necessarily the case that the regulator must transition to the opposite mode when region II is entered. For example, if the regulator is operating in region I, and later passes into region II, it is not necessarily the case that the regulator will transition into region III. It is also possible that the regulator may return to region I, and may then either remain in region I or oscillate back and forth between region I and II for a time.

Signal Vc2 is clamped at zero as long as Vc is less than V2. Further, signal Vc2 follows Vc if Vc is greater than V2. The PWM control signal (P2b) of the output pair power switches are generated from Vc2 and Vramp. Additionally, the duty cycle of P2b is inversely proportional to Vc2. Signal P2b reaches 100% duty cycle when Vc1 is at 0V. As error voltage Vc increases above V2, the duty cycle of P2b decreases. In one embodiment, there is a minimum duty cycle (e.g. 25%) for signal P2b at Vc=V3.

The design of regulator 200 of FIG. 2 is simplified by the fact that a common ramp is used. In one embodiment, circuit 200 also provides the circuit designer the flexibility of choosing the amplitude of Vramp. In one embodiment, the maximum amplitude of Vramp is not limited by the output range of the error amplifier. Also, in one embodiment, the loop gain can be adjusted by varying the amplitude of Vramp.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for DC-DC conversion, comprising:
   an error amplifier having at least an output;
   a rectifier/splitter having at least a first input, a first output, and a second output, wherein the first input of the rectifier/splitter is coupled to the output of the error amplifier, the rectifier/splitter is a rectifier, and wherein the rectifier/splitter is a splitter;
   a first comparator having at least a first input, a second input, and an output, wherein the first input of the first comparator is coupled to the first output of the rectifier/splitter; and
   a second comparator having at least a first input, a second input, and an output, wherein the first input of the second comparator is coupled to the second output of the rectifier/splitter, and wherein the second input of the second comparator is coupled to the second input of the first comparator.

2. The circuit of claim 1, further comprising:
   a first switch circuit that is coupled between an input voltage node and a first inductor node, wherein the first switch circuit has at least a control input that is coupled to output of the first comparator;
   a second switch circuit that is coupled between the first inductor node and a ground node, wherein the second switch circuit has at least control input that is coupled to the output of the first comparator;
   a third switch circuit that is coupled between an output voltage node and a second inductor node, wherein the third switch circuit has at least a control input that is coupled to the output of the second comparator; and
   a fourth switch circuit that is coupled between the second inductor node and the ground node, wherein the fourth switch circuit has at least a control input that is coupled to the output of the second comparator.

3. The circuit of claim 1, wherein
   the error amplifier is operable to provide an error voltage at the output of the error amplifier; and
   wherein the rectifier/splitter is arranged to provide a first rectifier/splitter output signal at the first output of the rectifier/splitter, and a second rectifier/splitter output signal at the second output of the rectifier/splitter, such that the first rectifier/splitter output signal and the second rectifier/splitter output signal are each proportional to the departure of the error voltage from a central value but increasing from zero, and such that at most one of the first rectifier/splitter output signal and the second rectifier/splitter output signal departs from zero depending on the error voltage.

4. The circuit of claim 1,
   wherein the error amplifier is operable to provide an error voltage at the output of the error amplifier; and
   wherein the rectifier/splitter is arranged to:
      provide a first rectifier/splitter output signal at the first output of the rectifier/splitter such that:
         if the error voltage is lower than a first voltage level:
            a voltage associated with the first rectifier/splitter output signal is greater than zero, and such that the voltage associated with the first rectifier/ splitter output signal is roughly proportional to the error voltage based on a negative constant of proportionality; and if the error voltage is greater than the first voltage level:

the voltage associated with the first rectifier/splitter output signal is approximately zero; and provide a second rectifier/splitter output signal at the second output of the rectifier/splitter such that:

if the error voltage is greater than a second voltage level:

a voltage associated with the second rectifier/splitter output signal is greater than zero, and such that the voltage associated with the second rectifier/splitter output signal is roughly proportional to the error voltage based on a positive constant of proportionality; and if the error voltage is less than the second voltage level:

the voltage associated with the second rectifier/splitter output signal is approximately zero, wherein the second voltage level is greater than the first voltage level.

5. The circuit of claim 1, further comprising:

a modulating waveform generator circuit having at least an output that is coupled to the second input of the first comparator and the second input of the second comparator.

6. The circuit of claim 5, wherein the modulating waveform generator circuit is configured to provide one of a sawtooth waveform or a triangle waveform at the output of the modulating waveform generator circuit.

7. The circuit of claim 5, wherein the modulating waveform generator circuit is configured to provide a modulating waveform signal at the output of the modulating waveform generator circuit such that the modulating waveform signal approximately oscillates between a minimum value and a maximum value, wherein the minimum value is slightly greater than zero volts.

8. The circuit of claim 7, further comprising:

a first switch that is coupled between an input voltage node and a first inductor node, wherein the first switch circuit is arranged to receive the input voltage at the input voltage node, and wherein the first switch circuit is arranged to be closed if the first comparator is tripped, and to be open if the first comparator is untripped;

a second switch that is coupled between the first inductor node and a ground node, and wherein the second switch circuit is arranged to be closed if the first comparator is untripped, and to be open if the first comparator is tripped;

a third switch that is coupled between an output voltage node and a second inductor node, wherein the output voltage is provided at the output voltage node, and wherein the third switch circuit is arranged to be closed if the second comparator is tripped, and to be open if the second comparator is untripped; and a fourth switch circuit that is coupled between the second inductor node and the ground node, wherein the fourth switch circuit is arranged to be closed if the second comparator is untripped, and to be open if the second comparator is tripped, wherein the rectifier/splitter is arranged to provide a first rectifier/splitter output signal at the first output of the rectifier/splitter, and to provide a second rectifier/splitter output signal at the second output of the rectifier/splitter;

the first comparator is arranged to trip if the modulating waveform signal is greater than the first rectifier/splitter output signal; and wherein the second comparator is arranged to trip if the modulating waveform signal is greater than the second rectifier/splitter output signal, whereby the first switch is closed, the third switch is closed, the second switch is open, and the fourth switch is open when the first and second rectifier/splitter output signals are both less than the minimum value of the modulating waveform signal.

9. The circuit of claim 1, wherein the rectifier/splitter includes a first differential amplifier and a second differential amplifier.

10. The circuit of claim 9, wherein the first differential amplifier includes: a first op amp, a first resistor that is coupled to the a first input of the first op amp, and a second resistor that is coupled between the first input of the first op amp and an output of the first op amp, wherein the output of the first op amp is coupled to the first input of the first comparator; and wherein the second differential amplifier includes: a second op amp, a third resistor that is coupled to the first input of the second op amp, and a fourth resistor that is coupled between the first input of the second op amp and an output of the second op amp, wherein the output of the second op amp is coupled to the first input of the second comparator.

11. The circuit of claim 9, wherein the output of the error amplifier is coupled to an inverting input of the first differential amplifier and a non-inverting input of the second differential amplifier.

12. The circuit of claim 9, further comprising a reference voltage generator circuit having at least an output, wherein the output of the voltage reference generator circuit is coupled to a non-inverting input of the first differential amplifier an inverting input of the second differential amplifier.

13. A circuit for DC-DC conversion, comprising:

a pulse width modulation (PWM) buck-or-boost (BOB) regulator controller that is arranged to use the same modulating signal for buck regulation of an output signal and boost regulation of the output signal, wherein the PWM BOB regulator controller includes:

an error amplifier that is operable to provide an error signal that is based, in part, on the output signal;

a first comparator having at least a first input, a second input, and an output, wherein the first comparator is arranged to: receive the modulating signal at the first input of the first comparator, receive a first comparison signal at the second input of the first comparator, provide a buck PWM signal at the output of the first comparator, wherein the first comparison signal is based, in part, on the error signal; and a second comparator having at least a first input, a second input, and an output, wherein the second comparator is arranged to: receive the modulating signal at the first input of the second comparator, receive a second comparison signal at the second input of the second comparator, and to provide a boost PWM signal at the output of the second comparator, wherein the second comparison signal is based, in part, on the error signal.

14. The circuit of claim 13, wherein the PWM BOB regulator includes a modulation waveform generation circuit that is operable to provide the modulating signal such that the modulating signal is either a sawtooth waveform or a triangle waveform.

15. The circuit of claim 13, further comprising:
a rectifier/splitter that is arranged to provide the first and second comparison signals based, in part, on the error signal.

16. A method for DC-DC conversion, comprising:
providing an error signal that is based, in part, on an output voltage at an output node;
if the error signal is less than a first value,
  performing buck regulation on an input voltage to provide the output voltage;
if the error signal is greater than a second value,
  performing boost regulation on the input voltage to provide the output voltage, wherein the second value is greater than the first value; and
if the error signal is between the first value and the second value
  performing a pass-through by switching the input voltage to the output node such that the output voltage is not regulated.

17. The method of claim 16, further comprising:
providing a first comparison signal that is based, in part, on the error signal;
providing a second comparison signal that is based, in part, on the error signal;
providing a buck PWM signal by comparing the first comparison signal with a modulating waveform; and
providing a boost PWM signal by comparing the second comparison signal with the modulating waveform.

18. The method of claim 17, wherein
performing the buck regulation includes:
  closing a high-side boost switch throughout the buck regulation;
  opening a low-side boost switch throughout the buck regulation; and
  opening and closing a high-side buck switch and a low-side buck switch based on the buck PWM signal;
performing the boost regulation includes:
  closing the high-side buck switch throughout the boost regulation;
  opening the low-side buck switch throughout the boost regulation; and
  opening and closing the high-side boost switch and the low-side boost switch based on the boost PWM signal; and
performing the pass-through includes:
  closing the high-side buck switch throughout the pass-through;
  closing the high-side boost switch throughout the pass through;
  opening the low-side buck switch throughout the pass-through; and
  opening the low-side boost switch throughout the pass-through.

19. The method of claim 17, wherein
providing the first comparison signal includes:
  if the error signal is lower than the first value:
    providing the first comparison signal such that a voltage associated with the first comparison signal is greater than zero, and such that the voltage associated with the first comparison signal is roughly proportional to the error signal based on a negative constant of proportionality; and
  if the error signal is greater than the first value:
    providing the first comparison signal such that the voltage associated with the first comparison signal is approximately zero; and
providing the second comparison signal includes:
  if the error signal is greater than a second value:
    providing the second comparison signal such that a voltage associated with the second comparison signal is greater than zero, and such that the voltage associated with the second comparison signal is roughly proportional to the error signal based on a positive constant of proportionality; and
  if the error signal is less than the second value:
    providing the second comparison signal such that the voltage associated with the second comparison signal is approximately zero.

* * * * *

UNITED STATES PATENT AND TRADEMARK OFFICE
CERTIFICATE OF CORRECTION

| | | |
|---|---|---|
| PATENT NO. | : 7,570,033 B1 | |
| APPLICATION NO. | : 11/397589 | |
| DATED | : August 4, 2009 | |
| INVENTOR(S) | : Shu-Ing Ju | |

It is certified that error appears in the above-identified patent and that said Letters Patent is hereby corrected as shown below:

On face page, in field (56), under "Other Publications", in column 2, line 6, delete "126-136" and insert -- 126-138 --, therefor.

In column 8, line 17, in claim 10, after "to the" delete "a".

In column 8, line 36, in claim 12, delete "an" and insert -- and an --, therefor.

In column 9, line 16, in claim 16, delete "value" and insert -- value; --, therefor.

Signed and Sealed this

Twelfth Day of January, 2010

David J. Kappos
*Director of the United States Patent and Trademark Office*